Figure 5:
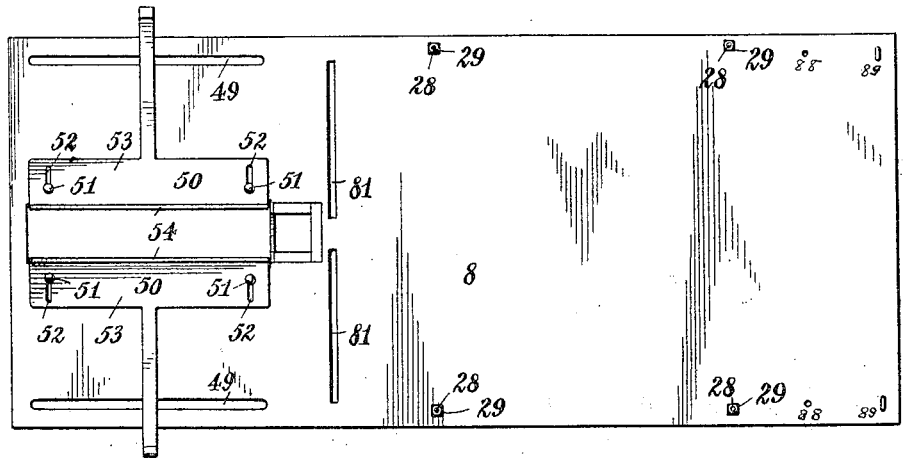

No. 800,463. PATENTED SEPT. 26, 1905.
S. A. MERKLEY, F. H. APEL & W. A. MERKLEY.
POULTRY BROODER.
APPLICATION FILED FEB. 20, 1905.
7 SHEETS—SHEET 1.
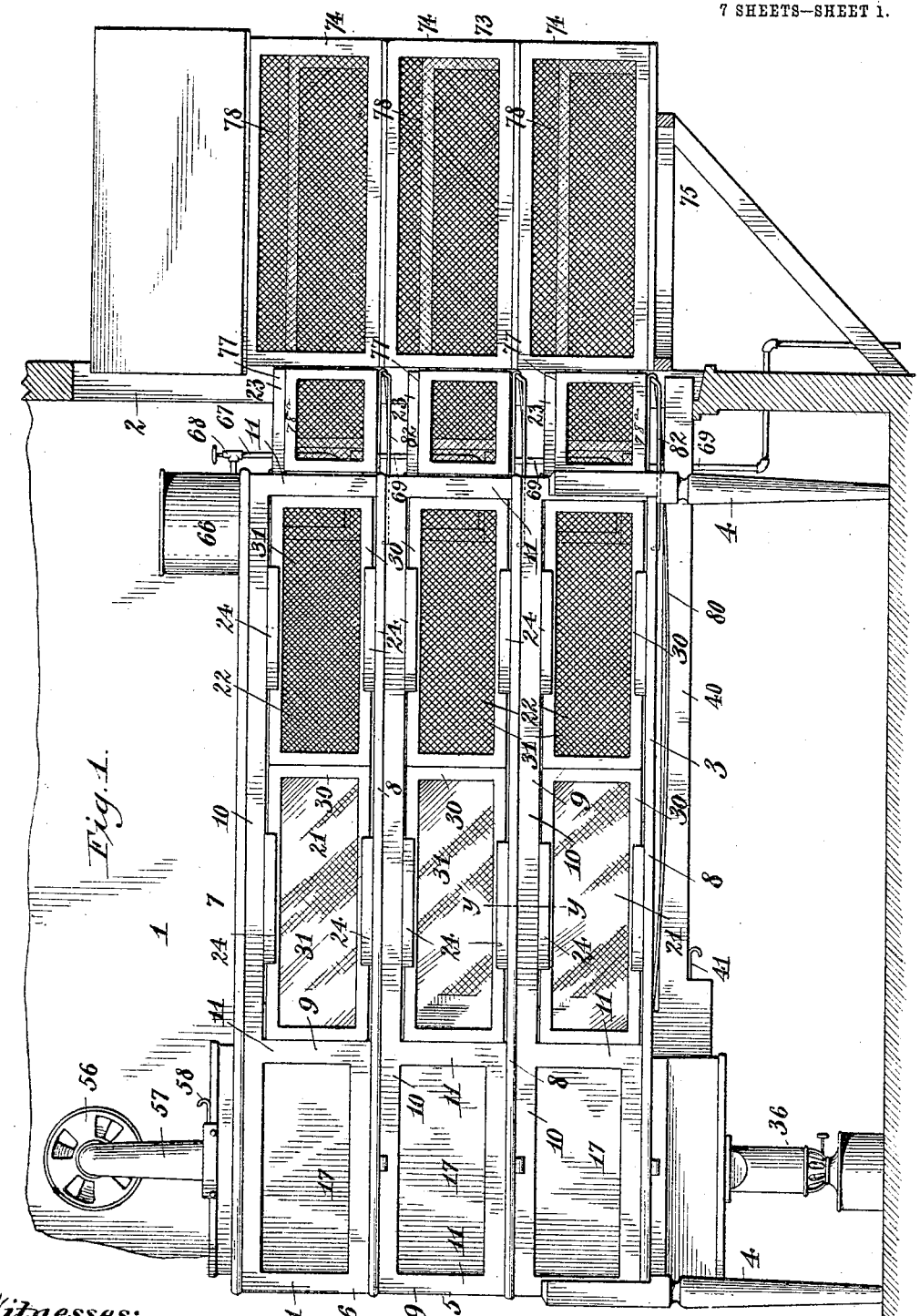
Witnesses:
Julius Lankes
Harry Harris
Fred H. Apel,
Stanley A. Merkley and
Wilburn A. Merkley } Inventors
By Emil Neuhart, Attorney

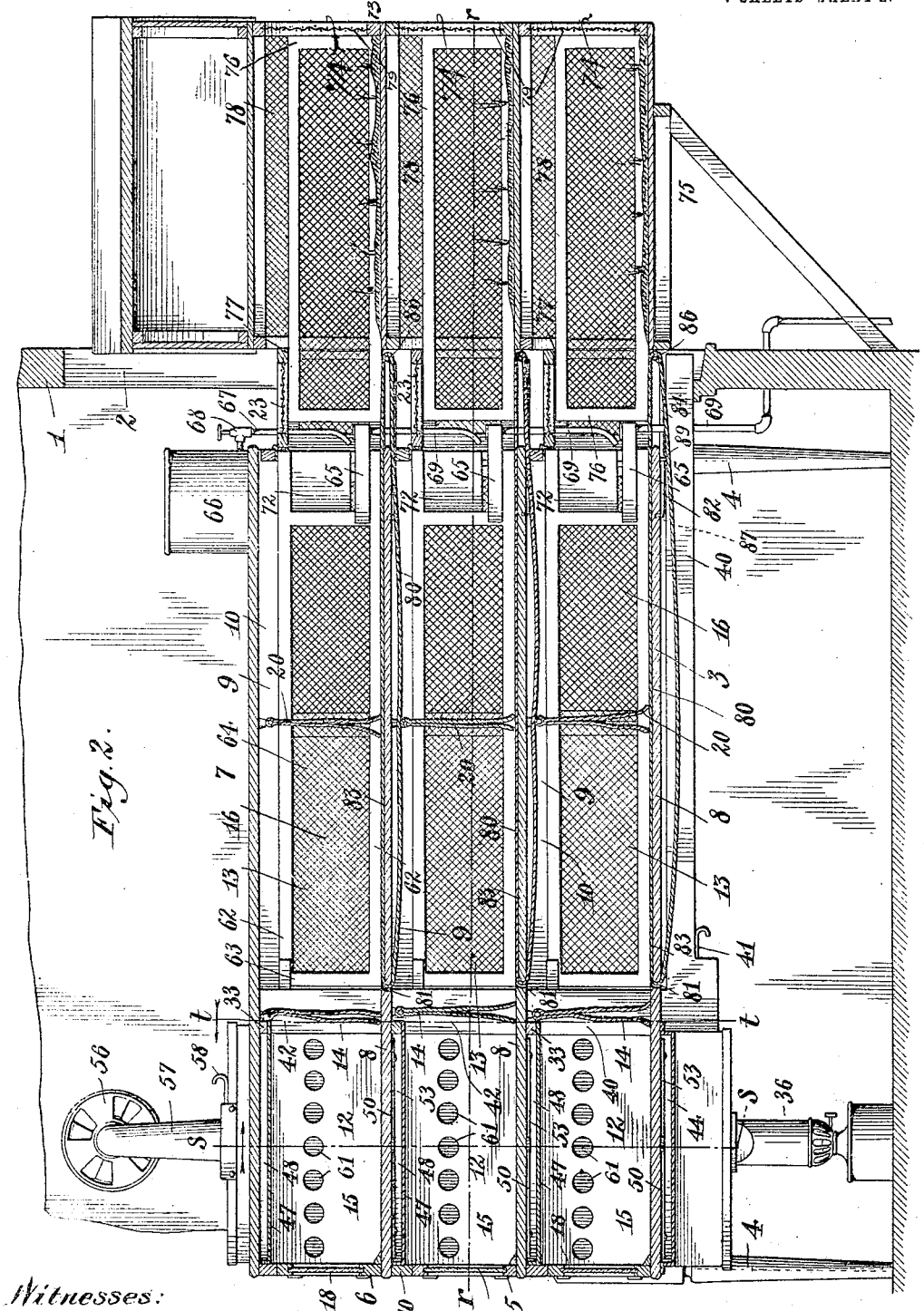

No. 800,463. PATENTED SEPT. 26, 1905.
S. A. MERKLEY, F. H. APEL & W. A. MERKLEY.
POULTRY BROODER.
APPLICATION FILED FEB. 20, 1905.
7 SHEETS—SHEET 3.
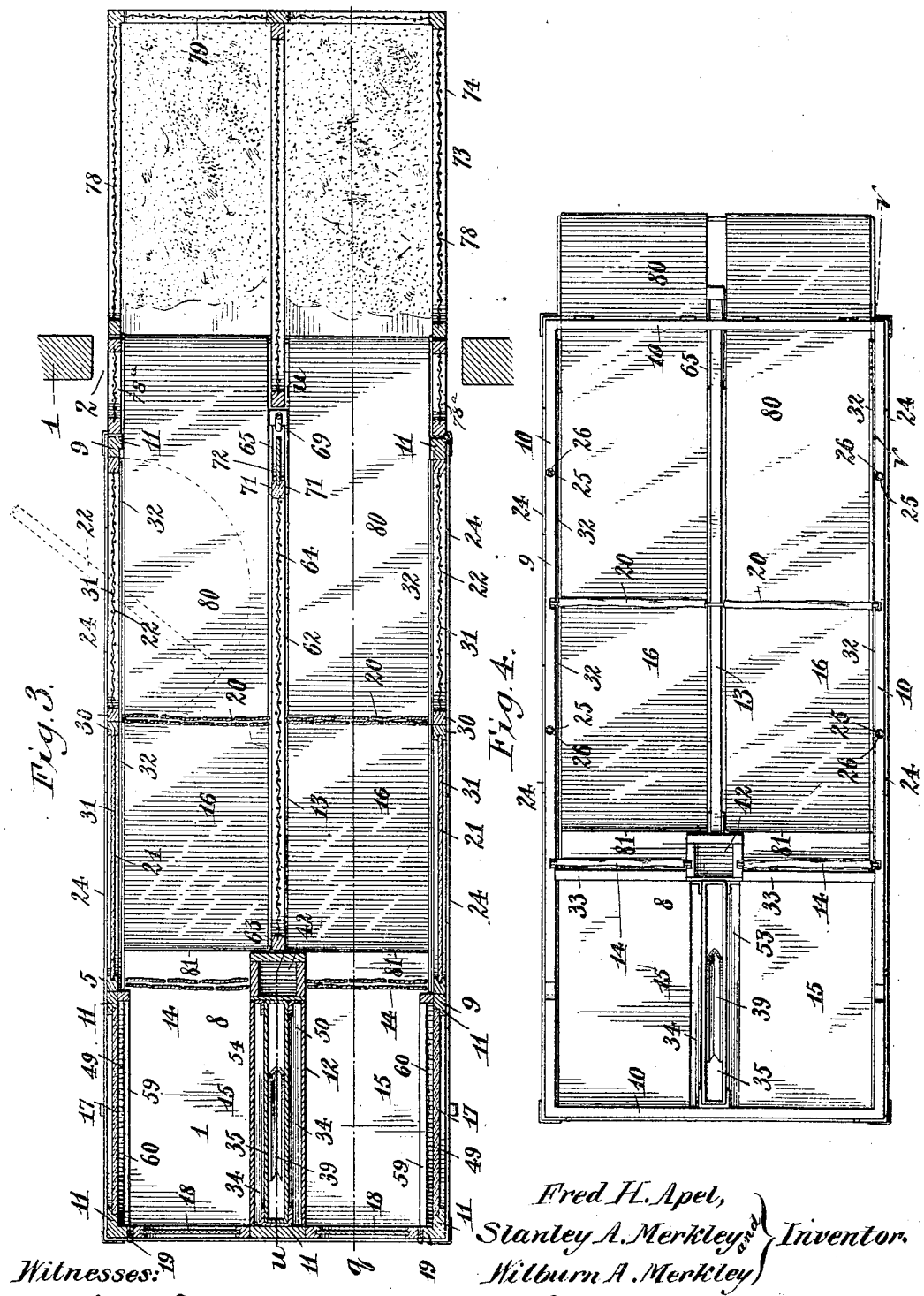

No. 800,463. PATENTED SEPT. 26, 1905.
S. A. MERKLEY, F. H. APEL & W. A. MERKLEY.
POULTRY BROODER.
APPLICATION FILED FEB. 20, 1905.

7 SHEETS—SHEET 4.

Witnesses:
Julius Lankes
Harry Harris

Fred H. Apel,
Stanley A. Merkley,
and Wilburn A. Merkley,
Inventors.
By Emil Neuhart, Attorney.

No. 800,463. PATENTED SEPT. 26, 1905.
S. A. MERKLEY, F. H. APEL & W. A. MERKLEY.
POULTRY BROODER.
APPLICATION FILED FEB. 20, 1905.
7 SHEETS—SHEET 5.
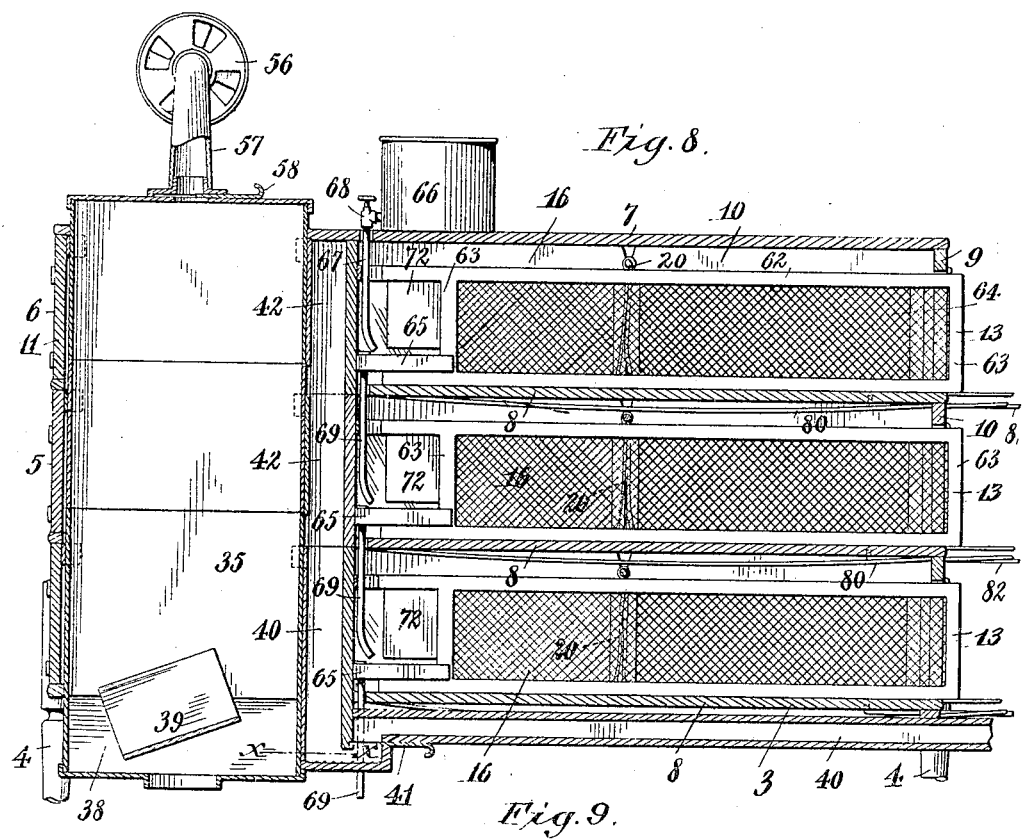
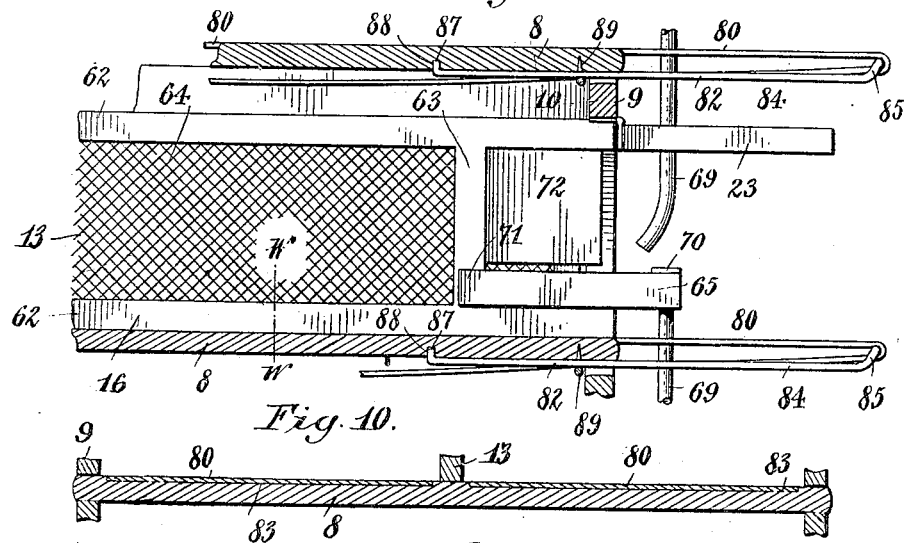
Witnesses:
Julius Lantes
Harry Harris
Fred H. Apel,
Stanley A. Merkley, Inventors.
Wilburn A. Merkley
By Emil Neuhack, Attorney.

No. 800,463. PATENTED SEPT. 26, 1905.
S. A. MERKLEY, F. H. APEL & W. A. MERKLEY.
POULTRY BROODER.
APPLICATION FILED FEB. 20, 1905.
7 SHEETS—SHEET 6
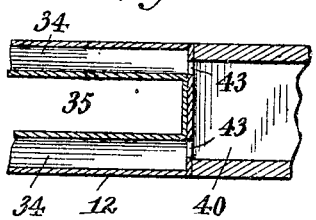
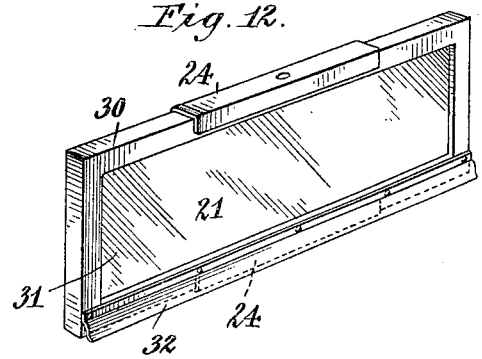
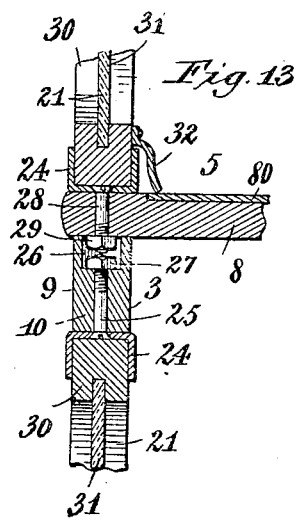
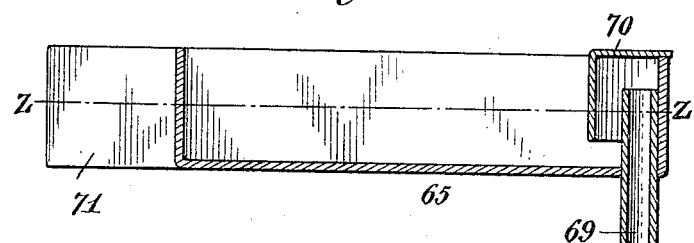
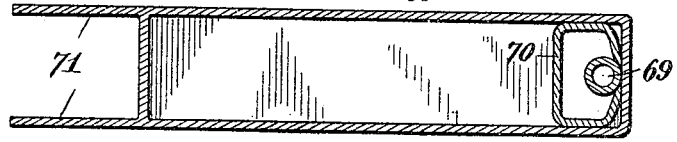
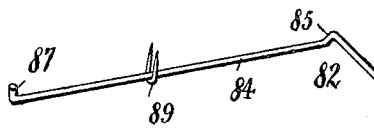
Witnesses:
Julius Lanker
Harry Harris
Fred H. Apel,
Stanley A. Merkley, Inventors.
and Wilburn A. Merkley
By Emil Newhart, Attorney.

No. 800,463. PATENTED SEPT. 26, 1905.
S. A. MERKLEY, F. H. APEL & W. A. MERKLEY.
POULTRY BROODER.
APPLICATION FILED FEB. 20, 1905.
7 SHEETS—SHEET 7.
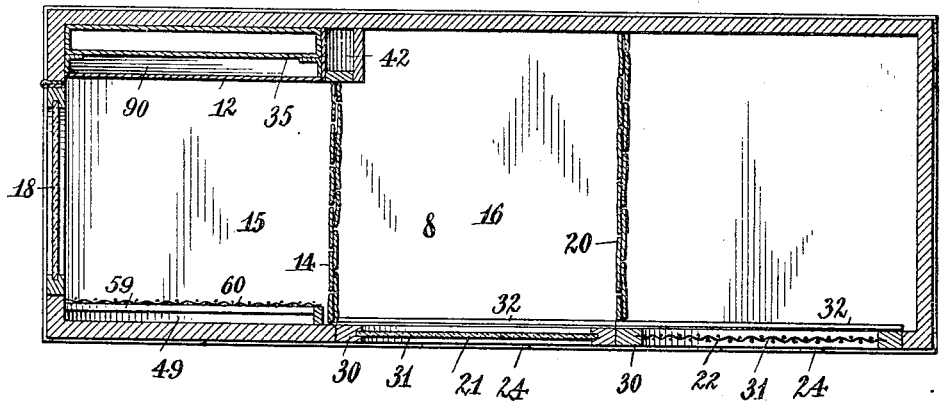
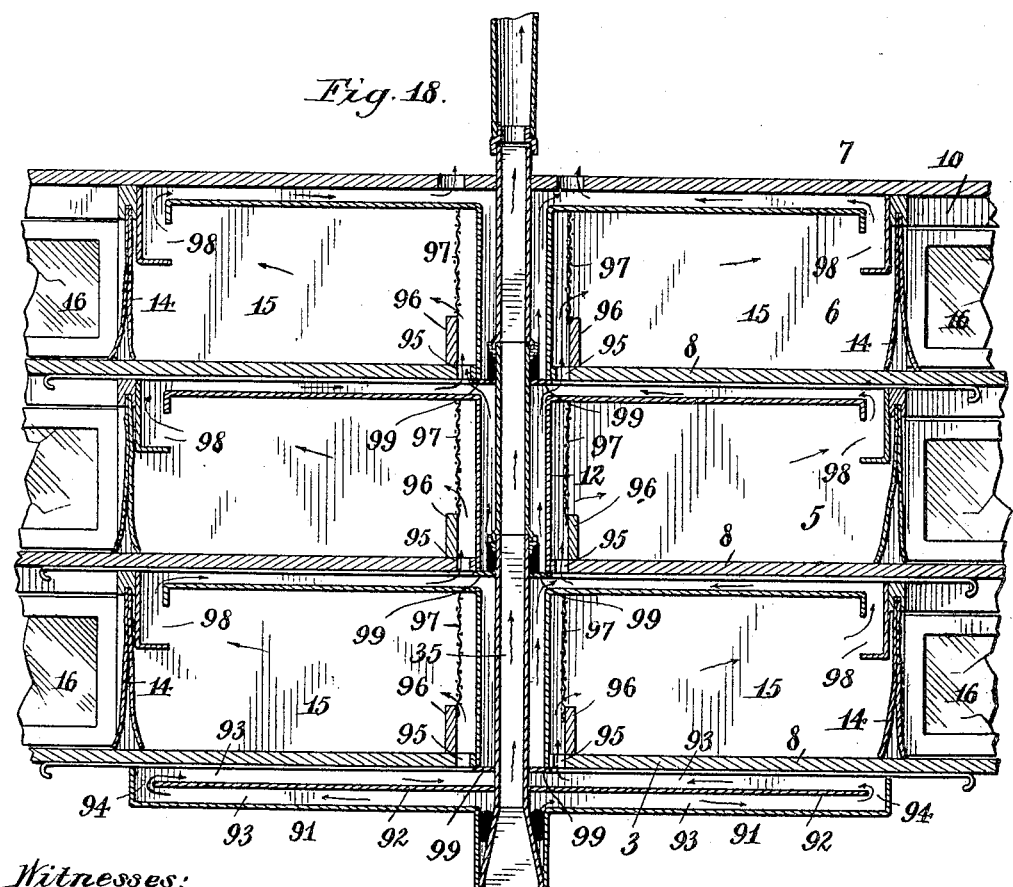
Witnesses:
Julius Lankes
Harry Harris
Fred H. Apel,
Stanley A. Merkley, Inventors.
and Wilburn A. Merkley
By Emil Neuhart, Attorney.

UNITED STATES PATENT OFFICE.

STANLEY A. MERKLEY, FREDERICK H. APEL, AND WILBURN A. MERKLEY, OF BUFFALO, NEW YORK.

POULTRY-BROODER.

No. 800,463.     Specification of Letters Patent.     Patented Sept. 26, 1905.

Application filed February 20, 1905. Serial No. 246,510.

*To all whom it may concern:*

Be it known that we, STANLEY A. MERKLEY, FREDERICK H. APEL, and WILBURN A. MERKLEY, citizens of the United States, residing at Buffalo, in the county of Erie and State of New York, have invented certain new and useful Improvements in Poultry-Brooders, of which the following is a specification.

Our invention relates to improvements in poultry-brooders composed of a plurality of superposed sections heated by a single heating device.

The primary objects of our invention are the production of a sectional brooder in which a single section can be used and which may as needs demand be increased in capacity by setting an additional section thereon or tiering up as a complete whole any number of sections, thereby economizing in floor-space and rendering the brooder easy to manipulate without stooping; to provide each of said sections with one or more hovers and a runway for each hover, each runway being separated from each hover by a curtain or flexible partition and each runway having a curtain or flexible partition dividing the same into two parts, one of which is closed and the other of which is open; to provide means for heating the hover and to maintain the temperature of the closed portions of the runways at a higher degree than the open portions thereof; to provide means for ventilating the room in which the brooder is set, and to provide an air-inlet which is connected with the outer air and serves to introduce fresh air to the hovers after being heated in transit thereto.

Other objects are to subject the fresh air to the heat of a suitable heater; to provide a heating device which heats the hover from above, and to direct currents of heated air through the upper part of each hover; to provide for passing the fresh warmed air from one section to the other and in its course from one section to the other introducing therewith currents of fresh air just taken into the air-inlet, which mingles with the warmed air and becomes warmed in transit to the next hover, and to provide means for easily regulating the heat to varying degrees in the several sections, as the age and condition of the chicks may require.

Further objects are to provide a brooder in which economy in space and fuel are the results of the improved construction used; to provide a construction in which the chicks are within view at all times and in which no obscure and dark nooks and corners are formed; to provide an automatic water-supply for the brooder; to provide revolving doors for the runways, whereby the floor thereof can be quickly cleaned of litter; to provide the floors of the runways with a movable facing or endless belt lying on the bottom of each section and adapted to be moved over the floor when soiled and a clean portion presented to the chicks, this being particularly desirable in the brooding of turkeys, which not only need tender care, but must be given clean and unlittered surroundings in order to thrive, and to provide means for holding said movable facing or belt taut over the floor and to loosen the same when desired to move a clean portion thereof into the runway.

Still further objects are to so construct the brooder that any section thereof can be removed from the tier of sections and used outside of the building when the chicks contained therein become old and strong enough to thrive without artificial heat; to provide each section with two hovers separated by a heat-radiating flue and two runways separated by a removable partition; to provide a watering device in which the water-receptacles are held on said removable partitions, at the outer ends thereof, and which may on a reversal of the partitions be brought close to the hovers, whereby weak chicks unable to travel through the runways to reach the water when at the outer ends of the partitions can easily reach the water-receptacles and quickly return to the warm hovers; to provide for the regulation and variation of temperature of each hover without diminishing the supply of fresh air warmed in transit to the hovers, and to provide an air-chamber under the bottom of the floor of each hover, whereby the hovers are heated by radiation from the top and bottom, as well as from the sides faced by the walls of the heating-flue, and in addition thereto passing the warmed air from the opposite sides through the upper portion of the hovers and into the heating-flue, thus providing perfect circulation.

Still further objects are to provide removable partitions or curtains in the runways which can be used when chicks are small to restrict the size of the glass-inclosed portion of the runways and which can be removed when chicks get older and do not require the high temperature maintained in a glass-inclosed runway; to provide for conveniently substituting screen-doors for glass doors in the sides of the runways, or vice versa; to provide a brooder in which chicks of different ages can be placed in different sections, in which pure fresh air is provided at all times, and in which the temperature can be kept constant, and to provide a detachable green runway which can be attached to the end of the brooder and extended through an open window to permit the chicks to bask in the sunlight.

With the above-mentioned and other objects in view our invention consists in the construction, arrangement, and combination of parts and devices to be hereinafter described, and particularly pointed out in the appended claims.

Figure 6:
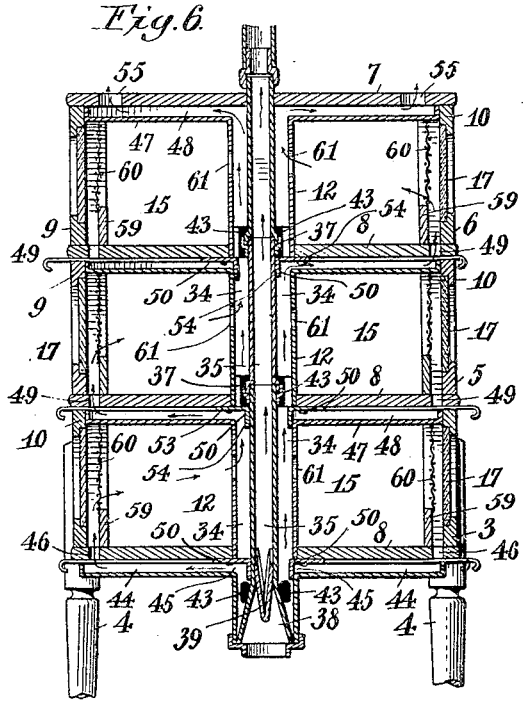
Figure 7:
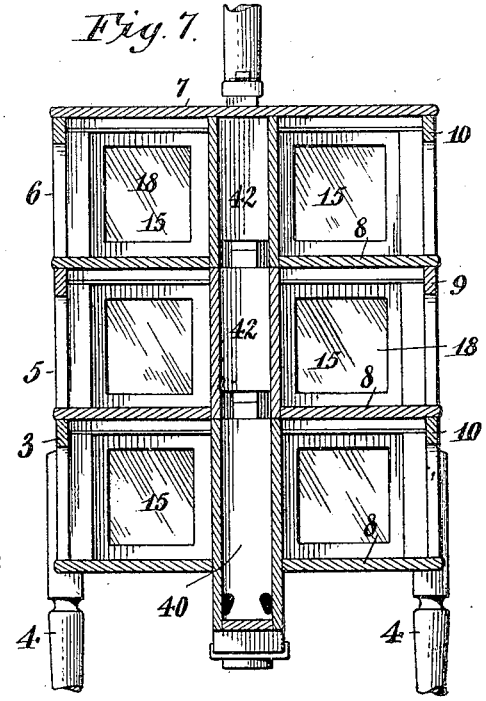

In the drawings, Figure 1 is a side elevation of our improved poultry-brooder. Fig. 2 is a longitudinal section taken on line $q\ q$, Fig. 3. Fig. 3 is a longitudinal section taken on line $r\ r$, Fig. 2. Fig. 4 is a top plan view of the brooder, the cover being removed and the green runway detached. Fig. 5 is a bottom plan view of one of the sections. Fig. 6 is a transverse section taken on line $s\ s$, Fig. 2, looking in the direction of the arrow crossing said line. Fig. 7 is a transverse section taken on line $t\ t$, Fig. 2, looking in the direction of the arrow crossing said line. Fig. 8 is a longitudinal section taken on line $u\ u$, Fig. 3, the central longitudinal portions being reversed to bring the water-receptacles close to the hovers. Fig. 9 is an enlarged longitudinal section taken on line $v\ v$, Fig. 4. Fig. 10 is a transverse section taken on line $w\ w$, Fig. 9. Fig. 11 is an enlarged horizontal section taken on line $x\ x$, Fig. 8. Fig. 12 is a detached perspective view of one of the revolving glass doorways for the runways and the guides therefor. Fig. 13 is an enlarged vertical section taken on line $y\ y$, Fig. 1. Fig. 14 is an enlarged longitudinal section through one of the water-troughs. Fig. 15 is a horizontal section taken on line $z\ z$, Fig. 14. Fig. 16 is a detached perspective view of one of the tension devices for drawing taut the endless belts in the runways. Fig. 17 is a modified form of our invention, in which a single hover and a single runway is provided for each section. Fig. 18 is a further-modified form of our invention, in which the hovers and the heating-flue separate the runways.

Referring to the drawings in detail, like numerals of reference refer to like parts in the several figures.

The reference-numeral 1 designates the wall of a building having a window-opening 2 therein.

3 designates the lowermost section of the brooder, which is carried by suitable legs 4, secured to the corners thereof in any suitable manner. This section can be used singly and be provided with a suitable cover; but as we have shown two superposed sections 5 and 6, each section serves as a cover for the next lower section, while the upper section is provided with a removable cover 7, which is applied to the top of the brooder irrespective of the number of sections used.

Each section comprises a bottom 8 and a skeleton frame 9, consisting of horizontal bars 10 and vertical bars 11. Secured or located between the horizontal bars 10 and the bottom are walls and doors to be hereinafter described, which form the sides of the sections, the top of each individual section being open. Each section is divided longitudinally by a heat-radiating flue 12 and a removable screen or other open-work partition 13 into two parts, and each of said parts is subdivided by a transverse curtain or flexible partition 14 into a hover compartment or chamber 15 and a runway 16. By this arrangement the heating-flue serves as the inner side wall of each hover compartment or chamber, and the curtain 14 serves as the inner end wall thereof. The outer side of each hover-compartment is rigid and consists of a plate of glass 17 and suitable framing to support said glass, and the outer end thereof is formed by a glass door 18, hinged to the frame 9, as at 19. Said doors therefore form one of the end walls of each section and render the hover convenient of access for cleaning or other purposes.

In some instances it is desirable to maintain a portion of a runway at a higher temperature than the other portion thereof, which may be done by means of a removable curtain or flexible partition 20. When this is done, we close the outer side of that part of the runway nearer the hover with a glass door 21, and the outer side of the other or end part of the runway we close with a screen or open-work door 22 to maintain the same at the temperature of the room in which the brooder is situated. At the other end of each runway we provide a hinged screen or open-work door 23, said doors serving as the other end wall of each section when the brooder is used without the green runway, to be hereinafter described.

The doors 21 22 at the sides of each section are removably held in pivotally or revolubly affixed channel-bars 24, arranged in pairs set in opposing relation. The upper channel-bar of each pair of bars is pivotally secured to the under side of the horizontal frame-bar 10 by a screw-bolt 25, passing through the channel-bar mid-length and through said frame-bar, the threaded end of said bolts terminating in sockets 26, formed in the upper face of the frame-bars, and in said sockets securing-nuts 27 are placed, into which the said bolts are screwed. The head of each bolt is countersunk in the channel-bar to provide a smooth surface. The lower channel-bars are similarly secured to the bottoms of the sections, with the screw-bolts 28 in line with those of the upper coöperating bars and with the threaded ends extending through the bottoms and the nuts 29 applied thereto. In tiering up the sections the nuts 29 enter the sockets 26 in the horizontal frame-bars of the underlying section, if any, as shown in Fig. 13, thereby providing for connecting the sections and holding the same against displacement. It is therefore apparent that the revolubly-secured channel-bars 24 are arranged in two vertical rows on each side of the brooder, with the pivotal points of each row in perfect alinement.

The side doors 21 22 consist of a suitable frame or sash 30 and a pane of glass or a screen 31 and are adapted to be slid into the channel-bars 24 to form the sides of the runways. This construction permits of using the doors interchangeably, it being an easy matter to remove a glass door from its retaining channel-bars and insert a screen door, or vice versa. Therefore when desired the sides of any or all of the runways can be closed with screen doors or with glass doors, or part of a runway can be closed with a glass door and the other part with a screen door, thus providing for maintaining a higher temperature in the entire runway than in the room in which the brooder is situated, or with the use of the curtain 20 providing for maintaining the temperature of the room in one part of the runway and a higher temperature in the other part thereof and also providing for maintaining the temperature of the room in the entire runway. The temperature of the runways may of course be varied in the different sections, depending on the age of the chicks confined therein.

Secured to each of the revolving doors 21 22 is a scraper 32, which is in contact with the floor and adapted to clear the same of solid litter when the door is revolved on its axis through a one-half revolution, as shown in dotted lines, Fig. 3.

The heat-radiating flue 12 in each section is of rectangular formation and is secured to the bottom and the adjacent end of the section and to cross-bars 33 connecting the upper end thereof with the framework 9. Arranged centrally within the heat-radiating flue and separated from the side walls thereof by air-spaces 34 is a heating-flue 35, underneath which a lamp or other suitable heat-generator 36 is placed.

When two or more sections are tiered up, the heating-flues of the several sections interlock, as shown at 37, and with the heat-radiating flue form an effective heating device irrespective of the number of sections used. The heating-flue in the base-section has its lower end flared, as at 38, and is provided with an inclined deflector 39 to direct the ascending heat toward the inner end wall thereof.

Arranged underneath the base-section is an air-intake flue 40, which extends into the outer air and at its inner end extends upwardly through the section adjacent the heating device, the inner end wall of the latter serving also as one of the walls of the air-flue. A valve 41 is provided to regulate the quantity of air to be taken into the brooder. Each additional section is of course provided with a coinciding air-flue 42, and in the wall dividing the air-flue from the air-space in the heating device are air-openings 43, the air entering said air-space through said openings being heated and passed through the hovers in manner now to be described.

Underneath the bottom of the base-section are air chambers or passages 44, which communicate at their inner ends with the air-spaces in the heating device, as at 45, and at their outer ends with the hover-compartments in said section by means of longitudinal slots 46, formed in the bottom of the latter. The top of the hover-compartments in the several sections are each closed by a wall 47, constructed of sheet metal or other suitable heat-radiating material, and between said wall and the bottom of the section next above an air-passage 48 is formed. Each of said air-passages 48 communicate at their inner ends with the air-space in the heating device and at their outer ends with the hover-compartments directly above by means of longitudinal slots 49, formed in the bottom of the section next above. These air-spaces may be entirely or partly shut off from the air-spaces in the heating device by valves 50, which are slidably connected to the bottom of the sections by pins or similar means 51, passing through transverse slots 52 in said valve. Each of said valves comprise a horizontal portion 53 held in contact with the bottom and a right angle or vertical portion 54 lying within the air-space in the heating device and adapted to completely shut off the horizontal air-passages 48 from the vertical air-spaces of the heating device.

When the valves are only partly closed, both the horizontal portion 53 and the vertical portion 54 serve to regulate the extent of opening to the air-passages. Each valve is provided with a handle extending out through the side walls of the brooder, with the outer ends thereof shaped for easily taking hold of the same to regulate the valves.

When the base-section is used singly, the cover forms the upper wall of the air-passage 48, or when two or more sections are used said cover forms the upper wall of the air-passage 48 in the top section. The cover is provided with longitudinal slots 55, which allows the escape of the hot air into the room, which ascends and passes out through a suitable regulator 56, surrounding the pipe 57, which is connected to the upper end of the heating-flue to pass off the noxious gases of the heater. Between the pipe 57 and the top of the heating-flue a damper 58 is placed for obvious reasons. In this manner the air within the room is always pure, which is essential to the health of the chicks in the screened runways.

In each hover-compartment adjacent the slots 46 49 is a vertical deflector 59, extending a short distance above the floor, and between the upper edge of the same and the top of the compartment is a screen 60 to prevent the chicks from perching on the deflector and falling between the same and the side wall of the section. In the wall of the heat-radiating flue slightly above the horizontal center of the hover-compartment are air-apertures 61. By arranging the latter above the center of the hover-compartments the warm air passes through said compartments above the heads of the chicks.

It is apparent from the foregoing that the air taken from the room and heated by the heater ascends into the heating-flue, but does not enter the chick-apartments. The pure air entering the intake-flue enters the air-openings in the heat-radiating flue and is heated by radiation from the heating-flue. Assuming all of the valves to be opened to their full extent, the fresh warmed air passes through the chambers or air-passages under the hover-compartments in the base-section, ascends through the slots 46 therein, then through said compartments and the apertures in the walls of the heat-radiating flue of said section, thence up and through the air-passages 48 above said chambers, continuing its course in the same manner through the hover-compartments of the superposed sections, and finally passing out through the slots in the cover into the room. After passing through the brooder in this manner the air is drawn out through the ventilator. By proper manipulation of the valves part of the fresh warmed air may be allowed to pass directly through the heat-radiating flue and out through the cover, or any of the compartments may be shut off, in which case the only heat obtained would be through the openings 61 therein, and by radiation from the wall separating the air-space in the heating device from the hover-compartment. As the heat ascends through the heat-radiating flue after having passed through a hover-compartment it commingles with fresh air entering through the air-openings 43, lying in the course of the air-current.

By means of the construction described the hover-compartments are warmed by radiation from the top and inner side walls thereof and by currents of warm fresh air passing underneath the bottoms of the compartment and through the compartment. This arrangement provides warm floors for the hover-compartments, the warmth of which may also be regulated by the valves 50.

Each of the removable longitudinally-disposed partitions 13 consists, by preference, of upper and lower bars 62, vertical bars 63, and screening 64, secured to said bars. One of said bars 63 is located a short distance from the ends of the bars 62, and in the open space thus provided a water-trough 65 is located.

Mounted on the top section of the brooder is a water-supply tank 66, from which extends a feed-pipe 67, having a valve 68 to regulate the drip of water through said feed-pipe and extending to the water-trough in the top section. Each of the water-troughs is provided with an overflow-pipe 69, extending from a point above the bottom thereof through the next lower section and terminating at the top of the water-trough in said section. The overflow-pipe of the water-trough in the base-section may be led outside of the building or to a suitable tank underneath the brooder, as may be desired. A hood or cap 70 is arranged over the top of each overflow-pipe with its sides extending below the upper end of the same, thus preventing floating substances reaching the inlet of said pipes and clogging the same on entering.

The water-troughs are supported on the lower bars 62 of the partitions, and each is provided at one end with side extensions 71, which lie on opposite sides of the adjacent bar 63 of the partition, whereby they are securely held. Secured to partitions and extending into the open space above the troughs are sheet-metal protecting-plates 72, which extend down to within a short distance of the top of the troughs and are disposed lengthwise and arranged centrally over the trough, thereby preventing the chicks getting into the troughs and fouling the water, as only sufficient space is provided to permit the heads of the chicks to enter between the walls of the trough and the plates 72. The water by dripping through the air from section to section is purified, which is a further aid to the healthy development of the chicks.

By reversing the partitions 13 end for end the water-troughs may be located at the end of the brooder to compel the chicks to pass through the runways, or they may be located convenient to the hover-compartment, as may best suit the age and development of the chicks in each brooder.

We wish to add that in some instances it may be desirable to dispense with the partition, while in others a rigid and solid partition may be of advantage, and therefore we do not wish to limit ourselves to the partition whether removable or fixed.

When desired, the end of the brooder can be set near a window or other suitable opening in the wall of the building and a green runway-housing 73, having similar superposed sections 74, attached thereto. This runway-housing may be supported by a suitable frame 75 and may be fixed to the building, if desired. The swinging doors closing the runways at the end of the brooder may be raised and supported on the longitudinal partitions 76 in the sections of the green runway-housing, as shown at 77. Said partitions 76 serve as a continuation of the partitions in corresponding sections of the brooder. The side walls 78 and the outer end walls 79 of the green runway-sections are constructed of screening or other suitable open-work material, and the inner walls thereof are open to provide runways which extend from the hover-compartments to the end walls 79. The floors of the green runways are covered with ground, in which is sprouted rye or some other grain to furnish the chicks with green food while they are out in the sunlight and the natural heated air. In cold weather the green runway may be attached to the brooder within the building; but we particularly designed the green runway for outdoor use. The brooder and the green runway-housing are separated a distance corresponding to the height of the doors 23 at the end of the brooder, so that when the latter are swung to a horizontal position and rest upon the partitions 76 they close the top of the runways between the brooder and the green runway-housing, while the sides are closed at this point by side extensions 78ª on the sections of the green runways which are hinged to the inner ends of the side walls of said housing.

Heretofore it has been impossible to brood turkeys in a brooder, as it has been found by experience that the litter on the floor of a brooder, which accumulates very quickly, has an ill effect upon them and that the brooders now in use cannot be kept as clean as necessary. For this purpose we have provided a movable facing for the floor, which consists of an endless belt 80, passing through a slot 81 in the floor of each runway and over a tension device 82, by means of which latter the belt is supported and stretched over the floor of each runway. In order to use these endless belts in connection with our improved revolving doors, the floor of each runway is provided with a depression 83, in which the belt is laid, and in this manner the surface of the latter is even with the floor proper, thus allowing said doors to revolve and clean the belt of litter without offering the least obstruction to the same. The said belt may be made of oil-cloth or any other suitable material. The belts, as shown, extend somewhat beyond the ends of the brooder. This is done to provide floor connections between the brooder proper and the green runway-housing and to allow for cleaning or washing the belts when moved to bring clean portions thereof into the runway.

Said floor connections may, however, be otherwise made, and, if desired, the endless belts need not extend beyond the end of the brooder more than just enough to permit of their being drawn taut, which can be done with a slight movement of the tension device to be now described.

Each of the tension devices 82 is formed of wire or other suitable material and comprises two longitudinal arms 84, curved upward at their outer ends, as at 85, and connected by a cross-bar 86, over which the endless belts pass and on which they are supported. The outer curved ends of the longitudinal arms 84 bring the supporting cross-bar 86 in line with the upper surface of the floor and provide for stretching the belt in a perfectly straight line. The inner ends of the longitudinal arms 84 are bent at a right angle to form prongs 87, and when the device is at normal said prongs enter depressions or sockets 88, formed in the under side of the bottom. In order to hold the tension device against the bottom and to allow the same to move lengthwise, arms 84 thereof pass through staples 89, secured to the bottom. When it is desired to move a clean portion of the belt of any section into the runway, slight upward pressure on the outer end of the tension device thereof will remove the prongs 87 of the latter from their sockets, when the device will be drawn inward by the belt. After such action takes place the belt can be moved and the soiled portion cleaned while a cleaned portion is being moved into the runway. In this manner the portion underneath the floor is always clean and ready for use.

In Fig. 17 we have shown a modification of our invention in which a single air-space 90 is provided between the heating-flue and the heat-radiating flue and in which each section is provided with a single hover-compartment and a single runway, the heating device being located in one corner of the section.

In the modification shown in Fig. 18 we have shown the heating device between the two hover-compartments and the runways on opposite sides of the latter. In this construction the base-section has two air chambers or passages 91, each divided by a partition 92, extending from the heating-flue to a point near the outer wall of the chamber and forming two passages 93, connected by the opening 94, provided by said partition at the outer end of the chamber. The warm fresh air enters through transverse slots 95, arranged in the bottom of each section on opposite sides of and adjacent to the heat-radiating flue. A deflector 96 and a screen 97 are provided, as in the construction first described. The top wall of the hover-compartments are each provided with a depending chamber 98, having an opening facing the screen 97. As in the previously-described construction, valves 99 are provided to shut off the air-current to any hover compartment or compartments desired or to regulate the temperature.

In the last-mentioned construction no air-apertures are required in the wall of the heat-radiating flue, and the warm fresh air in passing through the several hover-compartments moves from the heating device to the outer end of the compartments, as shown by arrows, while in the first-described construction the air in passing through the hover-compartments moves from the outer side thereof to the heating device.

This invention is susceptible to many changes in form, arrangement, and construction without departing from the principle embodied therein, and it is apparent from the foregoing that some of the parts and devices can be dispensed with without affecting the remaining parts.

Having thus described our invention, what we claim is—

1. A brooder composed of a plurality of superposed sections having sections of a heating device, whereby two or more sections can be used.

2. A brooder formed of a series of superposed sections, each section of the series having a heating device capable of use in connection with the heating device of any other section, and when connected forming a single heating device.

3. A brooder formed of one or more sections, and each section having a heating device and being capable of independent use or of use with one or more additional sections, and a single heat-generator for the brooder irrespective of the number of sections used.

4. A brooder formed of sections and consisting of a base-section having a heating device and being capable of independent use, and one or more additional sections adapted for use in connection with the base-section.

5. A brooder formed of a plurality of coöperating sections or chambers having coöperating sections of a heating device.

6. In a sectional brooder, the combination of a base-section having a heating device passing therethrough and a coöperating section having a heating device adapted for coöperation with the heating device of the base-section to form a single extended heating device, and a heat-generator for heating the air passing through said extended heating device.

7. In a sectional brooder, the combination of a base-section having a hover-compartment, a runway, and a heat-radiating flue passing through said section, a coöperating section likewise having a hover-compartment, a runway, and a heat-radiating flue coöperating with the heat-radiating flue of the base-section, a heat-flue extending through said heat-radiating flues, and a heat-generator beneath the heat-flue.

8. In a brooder, the combination with the wall of a house having an opening, of a chick-chamber, a heating device for said chamber, and an air-intake flue extending from said heating device to the opening in said wall to deliver the pure outer air to the heating device.

9. In a brooder, the combination with a plurality of coöperating sections having each a section of a heating device, a heat-generator, and an air-intake pipe leading to the heating device.

10. In a brooder, the combination with a plurality of coöperating sections having a heating device comprising a heat-flue and a heat-radiating flue separated from the heat-flue by an air-space, a heat-generator underneath the heat-flue, and an air-intake pipe leading to the air-space in the heating device.

11. In a brooder, the combination with a plurality of coöperating sections having a heating device comprising a sectional heat-flue and a sectional heat-radiating flue separated from the heat-flue by an air-space, a heat-generator underneath the heat-flue, and an air-intake flue leading from the heating device to the outer air.

12. In a brooder, the combination with a plurality of superposed sections having each a hover-compartment, a runway, and a heating device formed of coöperating sections, a heat-generator for said heating device, and an air-inlet flue connected with each section of the heating device to supply the latter with fresh air, said air-inlet flue extending from the heating device to the outer air.

13. In a brooder, the combination with a plurality of superposed sections having a heating device heating each section thereof and dividing part of each brooder-section into two hover-chambers, a partition dividing the remainder of each single section into two runways, and curtains or flexible partitions between the hover-chambers and the runways.

14. In a brooder, the combination with a plurality of superposed sections having each a section of a heating device dividing part of each brooder-section into two hover-chambers, and curtains or flexible partitions between the hovers and the remainder of the brooder-sections.

15. In a brooder, the combination with a brooder comprising a hover-chamber, a runway, and a heating device for the hover-chamber, of a detachable green runway serving as a continuation of the runway in the brooder and having a soil-covered bottom for vegetation.

16. In a brooder, the combination with a number of superposed sections, each having a hover-compartment and a runway, of an attachment comprising a corresponding number of green runways connected with the runways of the brooder and having soil-covered bottoms for vegetation.

17. In a brooder, the combination with a hover-chamber and a runway, of a detachable runway extension adapted to be placed in the outer air and connected to the runway of the brooder proper.

18. In a brooder, the combination with a series of superposed receptacles, each having two hover-compartments, a heating device between said hover-compartments, and a central partition forming two runways, of an attachment for the brooder comprising a number of corresponding sections, each having a partition in line with the central partitions in the sections of the brooder proper to form two runways for each section, said attachment having the bottom of its runways covered with soil for vegetation.

19. In a brooder, the combination with a hover-chamber, and a runway having a hinged door at its outer end, said door being hinged at its upper end to swing to a horizontal position, and a runway extension adapted to be placed in the outer air and having hinged extensions adapted to close the sides between the runway of the brooder proper and said runway extension.

20. A brooder comprising a hover-compartment, a runway, and means for directing a current of warm air through the hover-compartment.

21. A brooder comprising a hover-compartment, a runway, and means for directing a current of warm air through the upper part of the hover-compartment only.

22. A brooder composed of a plurality of detachable sections, and a sectional heating device having one section in each section of the brooder.

23. A brooder composed of a plurality of detachable sections, and a single heating device for said sections.

24. A brooder having a hover-compartment, a heating device communicating with the hover-compartment, and an air-passage underneath the floor of the hover-compartment in communication with the latter and the heating device.

25. A brooder having a hover-compartment, a heating device communicating with the hover-compartment, an air-passage underneath the floor of the hover-compartment in communication with the latter and the heating device, and an air-passage in the top of the hover-compartment also in communication with the heating device.

26. A brooder having a runway, and revolving doors closing the sides of the runway and serving as a means to clean the floor of the latter.

27. A brooder having a series of superposed sections, each section having a heating device consisting of a heat-flue and a heat-radiating flue separated from the heat-flue by a space, two hover-compartments in each section on opposite sides of the heating device, apertures formed in the heat-radiating flue to connect the heating device with the hover-compartments of the several sections, an air-passage underneath the floor of each compartment and underneath the cover, each air-passage communicating with the air-space in the heating device, and a slot connecting the air-spaces underneath each floor with the hover-compartment.

28. A brooder having a runway, channeled retaining-bars pivotally attached to the open sides of the runway, and removable doors fitting into said channeled bars.

29. A brooder having an endless belt passing over and below the floor thereof, a tension device supporting the end of said band and comprising a cross-bar and two longitudinal bars held slidably to the under side of the floor and having upturned ends, and depressions in the under side of the floor in which said upturned ends are held.

30. A brooder comprising a number of superposed sections, each section having open sides formed by a top bar having a socket formed in its upper face and vertical bars supported by the bottom, a channel-bar pivotally secured to the top bar of each section, and a coöperating channel-bar pivotally secured to the bottom of each section, pivot-bolts passing through said channel-bars mid-length and extending into the sockets in the top rail and through the bottom, respectively, the projecting ends of the bolts passing through the bottoms entering the sockets in the top bars of the next lower section, and suitable doors removably held in said channel-bars.

31. A brooder comprising a number of superposed sections, each section having open sides formed by a top bar having a socket formed in its upper face and vertical bars supported by the bottom, a channel-bar pivotally secured to the top bar of each section, and a coöperating channel-bar pivotally secured to the bottom of each section, pivot-bolts passing through said channel-bars mid-length and extending into the sockets in the top rail and through the bottom, respectively, the projecting ends of the bolts passing through the bottoms entering the sockets in the top bars of the next lower section, suitable doors removably held in said channel-bars, and scrapers secured to the lower end of said doors to act against the bottom of the sections on revolving said doors.

In testimony whereof we have affixed our signatures in the presence of two subscribing witnesses.

STANLEY A. MERKLEY.
  FREDERICK H. APEL.
  WILBURN A. MERKLEY.

Witnesses:
 EMIL NEUHART,
 MAY F. SEWERT.